United States Patent [19]

Combeau

[11] Patent Number: 5,178,423
[45] Date of Patent: Jan. 12, 1993

[54] FAST ASSEMBLY FOR FLEXIBLE PIPINGS

[76] Inventor: Alberto Combeau, Estado 235, of. 511, Santiago, Chile

[21] Appl. No.: 845,794

[22] Filed: Mar. 9, 1992

Related U.S. Application Data

[63] Continuation of Ser. No. 584,929, Sep. 19, 1990, abandoned.

[30] Foreign Application Priority Data

Feb. 28, 1990 [AR] Argentina .......................... 316.275

[51] Int. Cl.⁵ .............................................. F16L 33/00
[52] U.S. Cl. ................................... 285/247; 285/245; 285/386; 285/334.4
[58] Field of Search ............... 285/174, 175, 150, 155, 285/156, 245, 246, 247, 334.4, 387, 386

[56] References Cited

U.S. PATENT DOCUMENTS

| | | | |
|---|---|---|---|
| 646,590 | 4/1900 | Williams | 285/247 |
| 1,218,444 | 3/1917 | Muller et al. | 285/247 |
| 3,408,098 | 8/1968 | Wilson | 285/247 |
| 3,408,099 | 2/1968 | Appleton | 285/247 |
| 3,549,177 | 12/1970 | Sotolongo | 285/247 X |
| 3,687,492 | 8/1972 | Leopold et al. | 285/247 |
| 3,902,745 | 9/1975 | Mooney et al. | 285/247 |
| 4,124,234 | 11/1978 | Clark | 285/247 |
| 4,500,118 | 2/1985 | Blenkush | 285/247 |
| 4,522,432 | 6/1985 | Press | 285/156 X |
| 4,537,426 | 8/1985 | Carter, Sr. | 285/156 X |
| 4,951,976 | 8/1990 | Boelkins | 285/247 X |

FOREIGN PATENT DOCUMENTS

| | | | |
|---|---|---|---|
| 1267065 | 6/1961 | France | 285/247 |

Primary Examiner—Randolph A. Reese
Assistant Examiner—Timothy Aberle
Attorney, Agent, or Firm—Shlesinger, Arkwright & Garvey

[57] ABSTRACT

A connector for a flexible pipe comprises a unitary sleeve having an end portion for coupling to a flexible pipe. The coupling end portion includes an annular threaded projection, a cylindrical portion adjacent the projection, and a frusto-conical portion adjacent the cylindrical portion, with the frusto-conical portion tapering from wide to narrow toward the pipe. The frusto-conical portion has its widest portion adjacent the cylindrical portion and has a diameter greater than the diameter of the cylindrical portion and forms a radially extending shoulder therewith for permitting a first end portion including an outer edge of the pipe that is slipped over the coupling end portion beyond the shoulder to bend radially inwardly toward the cylindrical portion, thereby securing the pipe to the sleeve against an axial force directed away from the sleeve. The frusto-conical portion has its narrowest portion with a diameter slightly less than the inside diameter of the pipe, thereby facilitating insertion of the frusto-conical portion into the pipe. A nut includes a threaded portion that cooperates with the threaded projection. The nut includes an inwardly radially projecting flange with a central cylindrical opening with an inside diameter substantially equal to the outside diameter of the pipe. The flange includes an inside edge that wedges a second end portion of the pipe against and is disposed directly above the frusto-conical portion for thereby sealing the pipe relative to the sleeve.

12 Claims, 1 Drawing Sheet

FAST ASSEMBLY FOR FLEXIBLE PIPINGS

This application is a continuation of application Ser. No. 07/584,929, filed Sep. 19, 1990, now abandoned.

The present invention is related to the assembly of flexible pipes, such as polyethylene, polybutylene, polypropylene, flexible polyesters, polyamides, flexible PVC, or the like, and is specially directed to obtaining a fast coupling and, therefore, to providing an assembly which is done by hand alone (without use of tools).

The assembly of the invention is of a simple design, being made, preferably, of a plastic material in which the fitting is of a material harder than the material from which the pipe is made. The fitting is made of an essentially tubular body with one or more ends for coupling to a pipe, where the external surface of each end has a given geometry which, in cooperation with a nut, allows the pipe to be anchored to the fitting.

BACKGROUND OF THE INVENTION

There are certain types of fast couplings which consist of a threaded pipe (threaded in one or both of its ends) so that it allows a nut to make a connection to a second pipe. The second pipe is inserted into the opening of the threaded pipe and a toroidal element of rubber is pressed between the second pipe and the inside wall of the nut from the pressure exerted by the nut.

This union can only be used in installations where the elements to be fitted are secured to other supporting structures, because if this is not done, the line pressure can generate an axial shifting of the pipes.

Also well known is an assembly which consists of a tubular body that has, near one of its ends, a threaded ring section that terminates in a frustum cone so that its bigger diameter is slightly bigger than the inside diameter of the pipe to be fitted and its smaller diameter is slightly smaller than the inside diameter of the pipe. The union is complemented with a junction nut which consists of an internally threaded body which is partially blocked on one of its ends by a flap or side wall, which has in its center a circular opening to allow the inserting or tight fitting of the pipe to be connected. The coupling is made by introducing the frustum cone end portion of the assembly into a pipe end, which in turn widens the flexible pipe up to the threaded ring so that the pipe is permanently subjected to stress. This set is fixed by the flapped nut to prevent accidental axial movement of the pipe.

In this type of assemblies, the pipes are stressed towards the releasing of the pipes in the direction of the axial component of a force. This stress component is a factor of instability when the nut is not safely secured.

It is necessary to have a secure coupling even when the nut is noticeably loose.

SUMMARY OF THE INVENTION

In the assembly of flexible pipes, as when polyethylene, polybutylene, polypropylene, flexible polyesters, polyamides, flexible PVC, etc. are used, some leakage due to poor fluid-tightness and deficient resistance in the union could be expected when vibrations in the line are significant.

It is, therefore, an objective of the present invention to provide a fast assembly for flexible pipes based on a hollow body with at least one frustum cone end, which derives from a tubular portion. The assembly uses a flanged nut so that the coupling is done manually, without use of tools.

Another objective of the invention is to provide an assembly between pipes or between a pipe and a tap or similar structures, without using 0-rings or seals to maintain its fluid-tightness, or metallic rings that might corrode, to hold the pipe in place.

A further objective of the invention is to provide means of assembly where stress components in the pipe, once the means of assembly is installed, are essentially axial in a direction opposite to an axial force for separating the pipe from the assembly means.

A still further objective of the invention is to supply low priced assemblies for pipes of a plastic material that are easy to install, even by non-specialized persons.

An additional objective of the invention is to provide an assembly which may be easily disassembled and reused and which may also permit easy repair of the pipe lines.

BRIEF DESCRIPTION OF THE DRAWING

The present invention will be described in more detail in reference to the embodiment example, in which equal or equivalent parts are marked by the same reference numerals and in which.

DETAILED DESCRIPTION OF THE DRAWINGS

Figure 1:
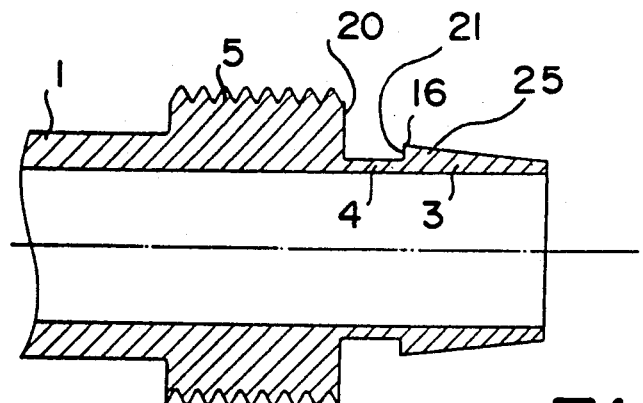
FIG. 1 shows an axial cross-sectional view of a hollow sleeve in accordance with the invention.
Figure 2:
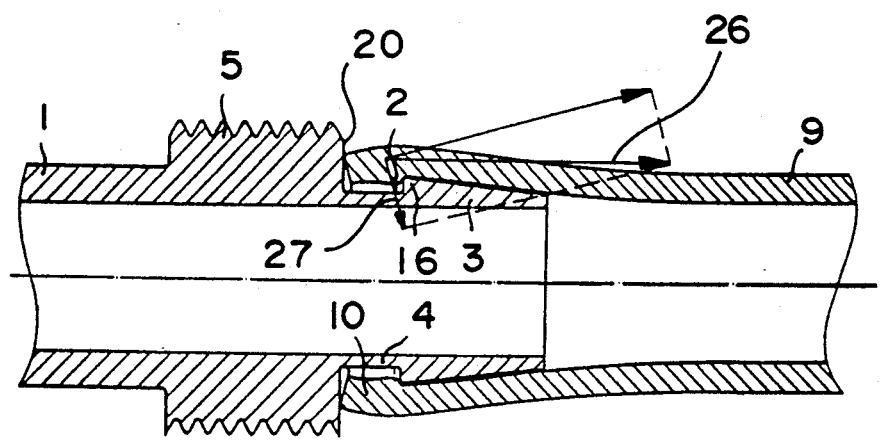
FIG. 2 shows the sleeve of FIG. 1 with a pipe fitted to the sleeve.
Figure 3:
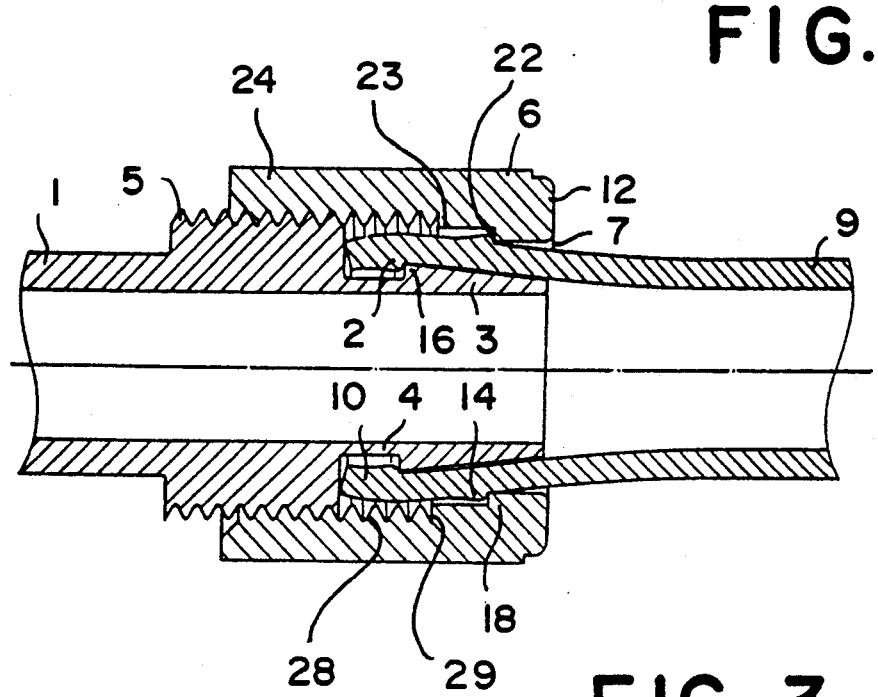
FIG. 3 shows a cross-sectional view similar to FIG. 2 but with a holding nut secured in place.

As can be seen from FIGS. 1 to 3 the present invention comprises a hollow body 1 which is allotted with a threaded circular projection 5 in an intermediate position of the body 1. Between the threaded circular projection 5 and a terminal end of the body 1, there is a tubular extension 4 and a frustum cone 3, which is connected to the tubular extension 4 by its greater base.

The external diameter of the frustum cone 3 next to the opening of the body 1 is slightly less than the internal diameter of a pipe 9 to be coupled. The diameter of the tubular extension 4 is somewhat greater than the internal diameter of the pipe 9 and the greater diameter of the frustum cone 3 is somewhat greater than that of the tubular extension 4, so that a perimetrical edge 16 and radially extending surface 21 are formed therebetween. It will be understood that a shoulder 25 is also formed.

To make a coupling with the element of the invention, the flexible pipe 9 is axially slipped over the frustum cone 3, reshaping the pipe 9 and widening it, as best shown in FIG. 2. The pipe 9 has a tendency to regain its original diameter. Therefore, an axial component of force is generated with the tendency to separate the pipe 9 from the body 1. When one continues to press the pipe 9 toward the tubular extension 4, and since the diameter of the flexible pipe 9 is smaller than the greater base of the frustum cone 3, the pipe 9 is caused to be constricted around the extension 4, specially if one considers that the greater diameter of the frustum cone 3 is slightly greater than that of the tubular extension 4. Thus, the pipe 9 is flared by the frustum cone 3 and then tends to recover to its original diameter over the tubular portion 4. Taking this into consideration, the end 10 of the flexible pipe 9 is subjected to inwardly directed radial forces (towards the center) which cause the pipe 9 to grab the body 1. The pipe 9 must be secured to the body 1 in such a way so that its end meets the radial plane 20 of the threaded circular projection 5.

Another aspect to be emphasized is that the perimetrical edge 16 tends to penetrate into the internal wall of the pipe 9 and, if the pipe 9 is axially pulled by a force 26 from the body 1, the end 10 of pipe 9 will deform into an internal annular wrinkle 2, due to a component force 27 which adds to the penetration of the edge 16 into the pipe 9, as best shown in FIG. 2. The length of the tubular portion 4 is made substantially longer than the height of the should 25 to provide sufficient room to permit the end 10 of the pipe 9 to recover towards its original diameter, thereby to aid in the formation of the annular wrinkle 2 and the penetration of the edge 16 into the pipe, as best shown in FIG. 3. Nevertheless, when the coupling is working, the pressure of the fluid inside the pipe 9 will cause the fluid to enter into the interstice between the pipe 9 and the frustum cone 3, until it reaches the edge 16, making the pipe expand and causing the fluid to leak out. To avoid this, a securing nut 6, which has a flange 12 in one of its ends, must be installed. The flange 12 has a circular centered generally cylindrical opening 7 that fits tightly to the external surface of the pipe 9. The internal border of the flange 12, in the area of the opening 7 is sharp, defining a circumferential edge 18. The nut 6 has radially extending wall 22 that cooperates with the opening 7 to form the edge 18. A threaded portion 24 cooperates with the threaded portion 5. A tubular portion 23 is disposed between the threaded portion 24 and the surface 22. The cylindrical portion 23 of the nut 6 is substantially equal in length to the cylindrical portion 4 of the body 1, as best shown in FIG. 3. Threads 28 of the threaded portion 24 are disposed below the cylindrical portion 23 such that a stop or shoulder 29 is formed therebetween that acts as a limit as to how far the nut 6 can advance into the threaded projection 5, thereby insuring that the sharp edge 18 is always positioned over the frustum cone 3.

When the nut 6 is installed in the assembly, the edge 18 will tend to wrinkle the external surface of the pipe 9, generally indicated as 14 in FIG. 3. The wrinkle increases every time the pipe 9 is subjected to a traction pull so that the annular wrinkle 14 opposes the separating of the pipe 9 and increases the sealing effect between the pipe 9 and the coupling assembly.

The frustum cone 3 preferable has an angle of about 7 degrees from a horizontal

The coupling assembly of the invention can be integrated with different components such as simple couplings, joints, "T" connections, cross connections, etc., for valves, fluid line measuring instruments, etc.

What is claimed is:

1. A connector for a flexible pipe, comprising:
   a) a unitary sleeve having an end portion for coupling to a flexible pipe;
   b) said coupling end portion including an annular threaded projection, a cylindrical portion adjacent said projection, and a frusto-conical portion adjacent said cylindrical portion, said frusto-conical portion tapering from wide to narrow toward the pipe;
   c) said frusto-conical portion having its widest portion adjacent said cylindrical portion and having a diameter greater than the diameter of said cylindrical portion and forming a radially extending substantially transverse shoulder with said cylindrical portion for permitting a first end portion including an outer edge of the pipe that is slipped over said coupling and portion and beyond said shoulder to bend radially inwardly toward said cylindrical portion, thereby securing the pipe to said sleeve against an axial force directed away from said sleeve;
   d) said frusto-conical portion having its narrowest portion with a diameter slightly less than the inside diameter of the pipe, thereby facilitating insertion of said frusto-conical portion into the pipe;
   e) a nut including a threaded portion cooperating with said threaded projection;
   f) said nut including an inwardly radially projecting flange with a central cylindrical opening with an inside diameter substantially equal to the outside diameter of the pipe; and
   g) said flange including an inside radially extending transverse surface for defining with said central cylindrical opening an inside edge that wedges, as viewed in a longitudinal cross-section, a second end portion of the pipe in substantial line contact against and directly above said frusto-conical portion for thereby sealing the pipe relative to said sleeve.

2. A connector for a flexible pipe, as in claim 1, wherein:
   a) said cylindrical portion has a length substantially longer than the height of said transverse shoulder.

3. A connector for a flexible pipe, as in claim 2, wherein:
   a) said frusto-conical portion has an angle of substantially 7° from horizontal.

4. A connector for a flexible pipe, as in claim 3, wherein:
   a) said cylindrical portion has a diameter slightly larger than the diameter of said frusto-conical portion narrowest portion.

5. A connector for a flexible pipe, as in claim 4, wherein:
   a) said cylindrical portion has a diameter slightly larger than the inside diameter of the pipe.

6. A connector for a flexible pipe, as in claim 1, wherein:
   a) said frusto-conical portion has an angle of substantially 7° from a horizontal.

7. A connector for a flexible pipe, as in claim 1, wherein:
   a) said cylindrical portion has a diameter slightly larger than the diameter of said frusto-conical portion narrowest portion.

8. A connector for a flexible pipe, as in claim 1, wherein:
   a) said cylindrical portion has a diameter slightly larger than the inside diameter of the pipe.

9. A connector for a flexible pipe, comprising:
   a) a unitary sleeve having an end portion for coupling to a flexible pipe;
   b) said coupling end portion including an annular threaded projection, a first cylindrical portion adjacent said projection. and a frusto-conical portion adjacent said first cylindrical portion, said frusto-conical portion tapering from wide to narrow toward the pipe;
   c) said frusto-conical portion having its widest portion adjacent said first cylindrical portion and having a diameter greater than the diameter of said first cylindrical portion and forming a radially extending substantially transverse shoulder with said first cylindrical portion for permitting a first end portion including an outer edge of the pipe that is slipped over said coupling end portion and beyond said shoulder to bend radially inwardly toward said first cylindrical portion, thereby securing the pipe to said sleeve against an axial force directed away from said sleeve;

d) said frusto-conical portion having its narrowest portion with a diameter slightly less than the inside diameter of the pipe, thereby facilitating insertion of said frusto-conical portion into the pipe;

e) a nut including a threaded portion cooperating with said threaded projections;

f) said nut including an inwardly radially projecting flange with a central cylindrical opening with an inside diameter substantially equal to the outside diameter of the pipe;

g) said flange including an inside radially extending transverse surface for defining with said central cylindrical opening an inside edge that wedges, as viewed in a longitudinal cross-section, a second end portion of the pipe in substantial line contact against and directly above said frusto-conical portion for thereby sealing the pipe relative to said sleeve;

h) said nut including a second cylindrical portion disposed between said threaded portion and said transverse surface;

i) said nut threaded portion is disposed below said second cylindrical portion and coaxial therewith; and j) said first cylindrical portion being substantially equal in length to said second cylindrical portion, thereby ensuring said inside edge to be positioned over said frusto-conical portion.

10. A connector for a flexible pipe, as in claim 9, wherein:
a) said cylindrical portion has a length substantially longer than the height of said transverse shoulder.

11. A connector for a flexible pipe, as in claim 9, wherein:

a) said frusto-conical portion has an angle of substantially 7° from a horizontal.

12. A connector system for a plastic semi-rigid pipe, comprising:
a) a plastic semi-rigid pipe having an end portion of substantially uniform outside diameter;
b) a unitary sleeve having an end portion for coupling to said pipe end portion;
c) said coupling end portion including an annular threaded projection, a cylindrical portion adjacent said projection, and a frusto-conical potion adjacent said cylindrical portion, said frusto-conical portion tapering from wide to narrow toward said pipe;
d) said frusto-conical portion having its widest portion adjacent said cylindrical portion and having a diameter greater than the diameter of said cylindrical portion and forming a radially extending substantially transverse shoulder with said cylindrical portion for permitting said first end portion including an outer edge of said pipe that is slipped over said coupling end portion and beyond said should to bend radially inwardly toward said cylindrical portion, thereby securing said pipe to said sleeve against an axial force directed away from said sleeve;
e) said frusto-conical portion having its narrowest portion with a diameter slightly less than the inside diameter of said pipe, thereby facilitating insertion of said frusto-conical portion into said pipe;
f) a nut including a threaded portion cooperating with said threaded projection;
g) said nut including an inwardly radially projecting flange with a central cylindrical opening with an inside diameter substantially equal to the outside diameter of said pipe; and
h) said flange including an inside radially extending transverse surface for defining with said central cylindrical opening an inside edge that wedges, as viewed in a longitudinal cross-section, a second end portion of said pipe in substantial line contact against and is disposed directly above said frusto-conical portion for thereby sealing the pipe relative to said sleeve.

* * * * *